(12) United States Patent
Kim et al.

(10) Patent No.: US 7,714,070 B2
(45) Date of Patent: May 11, 2010

(54) IN-REACTOR PRODUCED POLYPROPYLENE BLENDS

(75) Inventors: Sehyun Kim, Murrysville, PA (US); Rubén A. Migone, Pittsburgh, PA (US); Richard G. Michael, Jr., Deer Park, TX (US)

(73) Assignee: Sunoco Chemicals, Inc., Philadelphia, PA (US)

( * ) Notice: Subject to any disclaimer, the term of this patent is extended or adjusted under 35 U.S.C. 154(b) by 381 days.

(21) Appl. No.: 11/110,006

(22) Filed: Apr. 20, 2005

(65) Prior Publication Data

US 2005/0187349 A1    Aug. 25, 2005

Related U.S. Application Data

(60) Continuation-in-part of application No. 10/786,189, filed on Feb. 25, 2004, which is a division of application No. 10/228,487, filed on Aug. 27, 2002, now Pat. No. 6,733,898.

(51) Int. Cl.
*C08L 23/00* (2006.01)
*C08L 23/04* (2006.01)
*C08F 8/00* (2006.01)
*C08L 23/10* (2006.01)

(52) U.S. Cl. ............................. 525/191; 525/240
(58) Field of Classification Search ............ 525/191, 525/240
See application file for complete search history.

(56) References Cited

U.S. PATENT DOCUMENTS

| 5,691,043 A | 11/1997 | Keller et al. |
| 6,225,411 B1 | 5/2001 | Dang et al. |
| 6,512,019 B1 * | 1/2003 | Agarwal et al. ............. 521/134 |
| 6,576,306 B2 * | 6/2003 | Mehta et al. ............... 428/35.5 |
| 6,583,227 B2 * | 6/2003 | Mehta et al. ............... 525/240 |
| 6,639,018 B2 | 10/2003 | Yunoki et al. |

FOREIGN PATENT DOCUMENTS

| EP | 0 947 542 | 6/1999 |
| WO | WO 2004/020507 | 3/2004 |

\* cited by examiner

*Primary Examiner*—Nathan M Nutter
(74) *Attorney, Agent, or Firm*—Duane Morris LLP (57) ABSTRACT

Polypropylene resin compositions are provided that are useful in the production of thermoformed articles and biaxially oriented polypropylene films (BOPPs), tapes and fibers. The resins of the present invention are blends of high crystalline (low solubles) polypropylene homopolymer and an ethylene/propylene random copolymer (RCP). These blends can be used to replace standard high solubles BOPP grade polypropylene homopolymers. In addition, the use of high crystalline polypropylene homopolymers in the blends imparts improved stiffness to the finished films while maintaining good processability of the blends. Such polypropylene compositions are effectively produced by in-reactor blending of a high crystalline propylene homopolymer and a propylene/ethylene random copolymer.

11 Claims, 4 Drawing Sheets

Figure 1. T.M. Long Yield Stress of various compounds in comparison to FF020D as a function of temperature Figure 2. T.M. Long yield stress stretched at 138 and 143°C as a function of cast sheet density Figure 3. Thermal fractionation endotherms of HCPP (FF050HC) and its blend with 30% RCP in comparison to FF029A (31J026)

Figure 4. T.M. Long Yield Stress of various compounds in comparison to FF029A

Figure 5. T.M. Long yield stress stretched at 280 and 290°C as a function of cast sheet density Figure 6. Tensile Stress Figure 7. Tensile Modulus

Figure 8. Haze

Figure 9. % Transmittance

Figure 10. 45 degree Gloss

Figure 11. Shrinkage

IN-REACTOR PRODUCED POLYPROPYLENE BLENDS

RELATED APPLICATIONS

This application is a Continuation-in-Part of prior patent application Ser. No. 10/786,189 filed on Feb. 25, 2004, which is a Divisional of prior patent application Ser. No. 10/228,487 filed on Aug. 27, 2002, now U.S. Pat. No. 6,733,898.

FIELD OF THE INVENTION

The present invention is drawn generally to the field of polypropylene blends. More specifically, the present invention is drawn to a process for producing polypropylene blends in-reactor.

BACKGROUND OF THE INVENTION

BOPP (biaxially oriented polypropylene) film is produced by drawing a cast sheet of polypropylene in two directions at a temperature below the melting temperature of the resin. Specific characteristics are required for the standard polypropylenes used to produce BOPP materials, such as relatively larger amounts of xylene solubles, and relatively low isotacticity. It is known that for a given PP, the lower the isotacticity, the lower the melting temperature of the PP and the better its processability to BOPP film. However, these same properties in the PP result in poorer properties of the resulting film. Therefore, there exists a processability-property trade-off in BOPP materials. In addition, production of high solubles materials generally used for BOPP films is not easy because it requires a specific catalyst system and careful handling of powder. It is known that it is difficult to produce a homopolymer containing xylene solubles fractions higher than 6% because a specific catalyst system as well as careful handling of polymer powder in the reactor are required. In general, the large amounts of xylene solubles in the polypropylene become sticky and often cause agglomeration of polymer powder in the reactor, disrupting continuous production at the plant.

To avoid the problems of producing high solubles material, blends that improve the processability of low solubles material have been investigated. It is well known that isotactic PP (iPP) produced by a Ziegler-Natta (ZN) catalyst has a broad isotacticity and molecular weight distribution, thus exhibiting a broad melting temperature range. Conversely, PP produced by a metallocene catalyst exhibits narrow isotacticity and molecular weight distribution and thus, the melting temperature range is relatively narrow. Unlike PP produced by ZN catalyst, some degree of regio-mis-insertion, i.e., "head-to-head" or "tail-to-tail" insertions, of monomer exists in the metallocene isotactic PP (m-iPP). The melting temperature of m-iPP is also affected by the degree of regio-mis-insertion in addition to isotacticity. Thus, an iPP of much lower melting temperature than conventional ZN-iPP can be produced with a metallocene catalyst. When employed in BOPP film, however, a much narrower temperature window for drawing is available due to the narrow tacticity and molecular weight distribution.

The effect of the addition of m-iPP to ZN-iPP on BOPP film was explored by Phillips et al, *J. of Applied Polymer Science*, 80, 2400 (2001). It was found that the addition of m-iPP to ZN-iPP provides a balance of elevated temperature draw performance and room temperature film properties relative to the ZN-iPP materials. Improved processability of the BOPP film including fewer webs breaks and drawability at higher line speeds have been claimed by the addition of some amounts of metallocene syndiotactic PP to ZN-iPP in U.S. Pat. No. 6,207,093 to Hanyu, Mar. 27, 2001, Fina Technology. The addition of some amounts of modifier tends to improve processability of iPP and/or properties of the resulting film. The selection of the modifier depends on the desired film properties and availability of modifier.

In U.S. Pat. No. 5,691,043, to Keller et al addition of various atactic and syndiotactic polypropylenes, as well as various propylene copolymers to a standard BOPP grade isotactic polypropylene homopolymer to produce a core layer for multi-layer a uni-axially shrinkable film is discussed. However, Keller does not discuss the possibility of replacing standard BOPP grade polypropylene homopolymers with low soluble content material.

In addition to seeking replacements for high solubles polypropylenes, BOPP film manufacturers have long sought a material that provides a stiffer oriented film while maintaining acceptable stretchability. High crystalline PP materials impart the desired stiffness to the finished articles, however, these materials are generally not suitable for processing into BOPP films. This poor operability of high crystalline materials is reported in U.S. Pat. No. 5,691,043.

It would be desirable to provide a resin composition suitable for producing BOPP films that has both good processability and imparts the desired characteristics to the finished film. It would further be desirable to provide a resin for producing BOPP films that avoids the problems associated with producing high soluble content PP homopolymers. Such compositions could also comprise a high content of high crystalline polypropylene homopolymer to impart greater stiffness to the material. It would further be desirable to provide a process for producing a blend of high crystalline polypropylene homopolymer with a propylene copolymer by in reactor blending.

SUMMARY OF THE INVENTION

The present invention provides a process for producing blends of non-BOPP grade polypropylene homopolymers with ethylene/propylene random copolymers in-reactor. The compositions comprise from about 70% to about 95% of a non-BOPP grade polypropylene homopolymer and from about 5% to about 30% of an ethylene/propylene random copolymer. The blends allow the use of polypropylene homopolymers having a higher crystallinity (lower solubles content) than would otherwise be necessary for processing into BOPP films.

The compositions according to the current invention can be produced by melt blending of separate resin powders as well as by the in situ in-reactor blending process during production of the polymers. However, the production of these polymers by in-reactor blending allows for more efficient use of reactor capacity, as the in-reactor blending process can make use of the full capacity of a two-stage reactor train. This provides a higher production rate of the polymer blend versus the melt blending process. It also avoids the separate step of blending two separately produced polymers. The in-reactor blending process also results in better dispersion of the random copolymer in the homopolymer, and thus a more homogeneous product.

DETAILED DESCRIPTION OF THE INVENTION

The resin compositions according to the current invention are blends of non-BOPP grade polypropylene homopolymers and ethylene/propylene random copolymers. The blends according to the current invention may be produced either by melt blending separate powders or by producing the blend in situ in an in reactor process. In either case, the blends according to the current invention display processing characteristics that are comparable to or better than standard BOPP grade polypropylene homopolymers. Additionally, films made with resins according to the current invention display improved qualities in terms of haze, gloss and stiffness over films produced using standard BOPP grade polypropylene homopolymers.

Films comprising the resins according to the current invention can be made by any commercial process for producing films comprising standard BOPP grade homopolymers. For example, two prevalent commercial processes for producing oriented films are the tenter frame process and the "bubble" or blown film process.

In a typical tenter frame process, molten polymer is supplied to a flat slot die, from which a cast sheet or film is extruded. This cast sheet or film is then conveyed to a chill roller where it is cooled to a suitable temperature. The cast sheet or film is then conveyed to a pre-heat roller where it is heated to an appropriate stretching temperature. Stretching in the machine direction is accomplished by means of a pair of sequential rollers. The first, slow roller is followed by a second fast roller that rotates at a speed sufficient to generate a surface speed that is typically 4-7 times faster than the slow roller. The speed differential between the fast and slow rollers causes a 4-7 fold stretching of the cast sheet or film in the machine direction. After stretching in the machine direction, the film is then cooled again by additional chill roller(s) before being conveyed to a second pre-heat roller where it is heated to an appropriate temperature for stretching in the transverse direction. The transverse stretching section of the tenter frame then stretches the film by means of a plurality of tenter clips, which grasp the opposite sides of the film and stretch it in a lateral direction. The concluding portion of the stretching process may include an annealing section. After chilling to an appropriate temperature the film is then trimmed of waste and then applied to take up spools.

The typical steps involved in the bubble or blown film process include extruding the molten polymer is through an annular die and quenching in water to form a calibrated tube. The tube is then conveyed to the orientation tower where it is reheated to the optimum temperature for orientation. At the top of the tower, the tube is squeezed airtight by the first stretching nip. The tube is then heated and inflated with high-pressure air to form a large diameter bubble. The bubble orients the film in the transverse direction while simultaneously, the bubble is stretched in the machine direction by the speed differential between the first and second stretching nips. The oriented bubble is then collapsed by converging rolls and then annealed. After annealing, the film is slit into two webs. Each web is corona treated or flame treated and then wound.

Those skilled in the art will recognize that these examples of a tenter frame and bubble process are for illustrative purposes only. Variations on either process are within the knowledge of one skilled in the art and are considered to be within the scope of the present invention. Further, films produced using the resin compositions according to the current invention are not limited to those produced by either the tenter frame or bubble process. The resin compositions according to the current invention are useful in the production of BOPP films generally and are not limited to the specific methodology disclosed herein.

The resin compositions according to the current invention comprise from about 70% to about 95% of a low solubles polypropylene homopolymer and from about 5% to about 30% of an ethylene/propylene random copolymer. Preferably, the resin compositions according to the current invention comprise from about 70% to about 90% of a low solubles polypropylene homopolymer and from about 10% to about 30% of an ethylene/propylene random copolymer (RCP).

Polypropylene homopolymers that are suitable to be used in the compositions according to the current invention have a crystalline content of at least 55%, and a solubles content less than about 3%, preferably less than about 2%. Examples include, but are not limited to: D022D, F020HC and F050HC from Sunoco, 3576X, PPH4025, 3365 and 3281 from TotalFina, 5A28 from Dow, 6219, 1012, HB3252 and 9433x from BPAmoco, Adstiff HA722J from Basell, PP1042 from ExxonMobil, Marlex HGX-030 and HGX-040 from Phillips Sumika. The ethylene/propylene RCPs that are suitable for use in the resin compositions according to the current invention contain from about 0.5% to about 7% of ethylene, preferably about 2.5% ethylene. Examples of ethylene/propylene copolymers include, but are not limited to: TR3020F, TR3005, TR3020SF from Sunoco, DD20 and 6D65L from Dow, 8573, 6232, 6253, 7450HC, 7231X, 8453 and Z9450 from TotalFina, 8249, KB4105, 8244, KB5180 and KB4285 from BPAmoco, PP9852E1 from ExxonMobil, Marlex RGX-020 from Phillips Sumika, and SR256M and SR257M from Basell.

The resin compositions according to the current invention can be produced by melt blending a low solubles polypropylene homopolymer, such as those listed above, with an ethylene/propylene copolymer, such as those listed above, by compounding in a known way. However, preferably, the resin compositions according to the current invention are produced in situ in a multi reactor process. For example, in a four reactor process, the polypropylene homopolymer may be produced in the first two reactors, the first stage. The ethylene/propylene RCP may then be produced in the third and fourth reactors, the second stage, as the homopolymer continues to polymerize. Alternatively, in a two reactor process, the polypropylene homopolymer is made in the first reactor and the ethylene/propylene RCP may be made in the second reactor as the homopolymer continues to polymerize. In this way, the ethylene/propylene RCP may be distributed more uniformly in the blend. Although production of the blends by an in-reactor process is preferred, blends made by either method are suitable for producing BOPP films according to the current invention. The in-reactor process provides better dispersion of the random copolymer in the homopolymer versus the melt blending process. The in-reactor blending process also allows for more efficient usage of reactor capacity since both stages of a two-stage reactor train are utilized, as opposed to just the first stage, which is standard practice in making a pure homopolymer. This also provides higher production rates of the polymer blend.

The resin compositions and BOPP films according to the current invention may also include a number of additives, including but not limited to: nucleators, anti-oxidants, acid neutralizers, slip agents, antiblock, antifogging agents and pigments.

EXAMPLE 1

Conventional Polypropylene

Several samples of a resin blend according to the current invention were prepared using a conventional non-BOPP grade polypropylene homopolymer having low solubles. Polypropylene homopolymer, D022D, available from Sunoco, was melt blended with various amounts of a random copolymer resin having 2.5% ethylene, TR3020F, available from Sunoco. A commercial BOPP grade polypropylene, FF020D, available from Sunoco, containing relatively large amounts of xylene solubles, e.g., 4.9%, was included for comparison. The various blends prepared are shown in Table 1.

TABLE 1

Compositions Prepared

| Resin | A | B | C | D | E | F |
|---|---|---|---|---|---|---|
| D022 | 100 | 95 | 90 | 80 | | |
| TR3020 | | 5 | 10 | 20 | 100 | |
| FF020D | | | | | | 100 |

The melt flow rate (MFR) and The contents of xylene soluble were determined by the method prescribed in ASTM 1238 and 5492, respectively. The molecular weights were determined by high temperature size exclusion chromatography (HSEC) at 140° C. For thermal characteristics, DSC (Differential Scanning Calorimetry) thermograms were recorded, where polymer was melted at 230° C. for 5 minutes and cooled to 0° C. at a rate of 10° C./min while the recrystallization exotherm was recorded. Then, the sample was heated to 190° C. at a rate of 10° C./min in order to record the melting endotherms. The heat of recrystallization was used to estimate the overall crystallinity (% Xc) of ICP. The characteristics of compounds containing random copolymer along with homopolymers and random copolymer are given in Table 2.

TABLE 2

Characteristics of compounds containing RCP in comparison to FF020D

| Property | A | B | C | D | E | F |
|---|---|---|---|---|---|---|
| D022 | 100 | 95 | 90 | 80 | | |
| TR3020 | | 5 | 10 | 20 | 100 | |
| FF020D (30H036) | | | | | | 100 |
| MFR | 2.0 | 1.8 | 1.8 | 1.8 | 2.4 | 2.0 |
| % XS | 2.9 | 2.9 | 3.1 | 3.3 | 5.2 | 4.9 |
| Mn/1000 | 64 | 64.9 | 65.0 | 65.7 | 65.9 | 66.0 |
| Mw/1000 | 333 | 330 | 328 | 322 | 296 | 349 |
| Mz/1000 | 930 | 912 | 917 | 874 | 751 | 1045 |
| D | 5.22 | 5.08 | 5.05 | 4.91 | 4.49 | 5.29 |
| $T_m$ (° C.) | 164.8 | 164.8 | 163.1 | 162.9 | 149.2 | — |
| $T_c$ (° C.) | 115.0 | 112.5 | 112.1 | 112.0 | 103.4 | — |
| % $X_c$ | 58.7 | 57.3 | 57.5 | 56.3 | 45.6 | 53.9 |

Samples contain 0.15% Irgafos 168, 0.1% Irganox 1076, 0.1% Irganox 1010 and 0.025% DHT It is known that the isotacticity of the insoluble fraction of polypropylene and the amounts of solubles are inversely related and determine the crystallinity of the polymer. Thus, a random copolymer (RCP) that has relatively lower crystallinity with larger amounts of xylene solubles than a homopolymer could modify (or decrease) the overall crystallinity when added to homopolymer. Table 2 indicates that the addition of RCP slightly increases the amounts of xylene solubles, decreases the overall crystallinity and the recrystallization temperature. Addition of 20% RCP was not, however, enough to decrease the overall crystallinity of the compound to the same level as that of the standard BOPP grade polypropylene. Based on the additive rule, it appears that about 40% RCP is required to have a comparable overall crystallinity to FF020D.

Cast Sheet and T. M. Long Films

Cast sheets 22-23 mil thick were prepared from these materials in Table 2 using HPM sheet line (L/D=30) under the conditions shown in Table 3. The extruder was equipped with a flat die for vertical extrusion. The polymer melt extruded through the die was quenched on to a chill roll into the sheet. The temperature of the chill roll was kept at 110° F. (43.3° C.).

TABLE 3

| Zone | 1 | 2 | 3 | 4 | Die 1 | Die 2 | Melt Temp. |
|---|---|---|---|---|---|---|---|
| Temp. (° C.) | 204 | 246 | 260 | 260 | 260 | 260 | 263 |

The density of the extruded sheets was measured in a Techne Density column containing 558 ml $H_2O$ and 322 ml isopropanol mixture in the heavy flask and 327 ml $H_2O$ an 553 ml isopropanol in the light flask.

Figure 1:
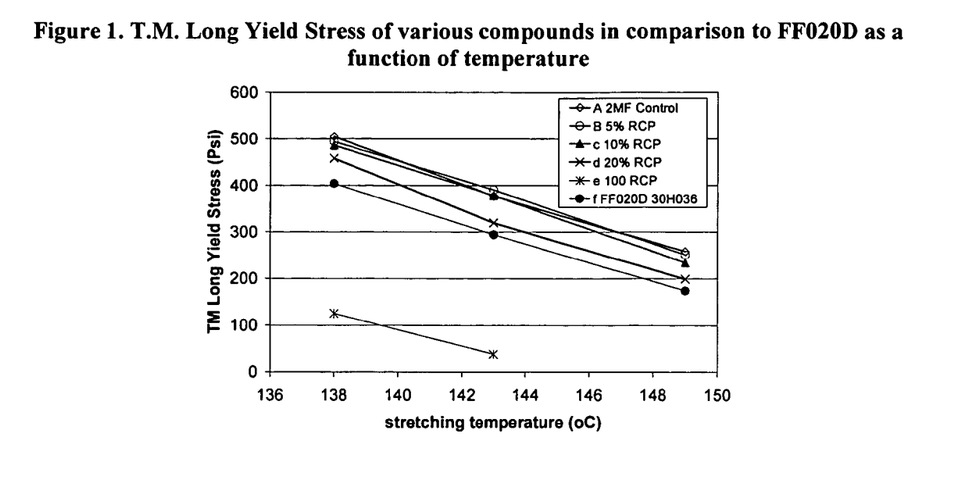
FIG. 1 shows the T. M. Long Yield Stress of various compounds as a function of temperature.
Figure 2:
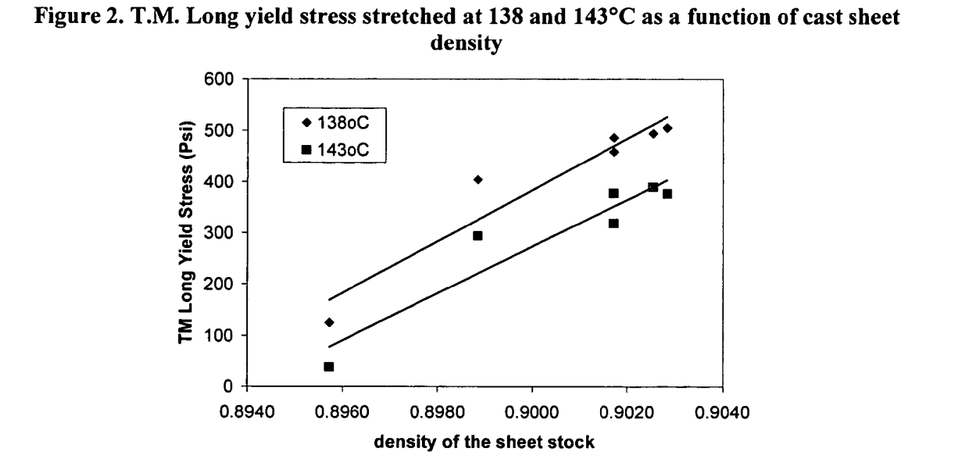
FIG. 2 shows the T. M. Long yield stress stretched at 280 and 290° F. as a function of cast sheet density.

For film preparation, polypropylene was extruded onto a cast roll to produce either 0.254 or 0.508 mm thick sheet. Samples (5.08 cm×5.08 cm) were cut out of the sheet stock and stretched with a T. M. Long stretcher (T. M. Long Corporation, Somerville, N.J.). This equipment allows simultaneous and/or consecutive biaxial orientation at an elevated temperature. Samples were stretched with the T. M. Long at a given stretching temperature and a fixed strain rate of 50.8 mm/sec after 25 sec. pre-heating. The tensile biaxial stress-strain curve is simultaneously generated during orientation. The sheets were stretched to 0.6-0.7 mil film by simultaneous stretching at 6.2×6.2 draw ratio. The film properties were determined by the method prescribed in ASTM 882. Table 4 gives the density of the cast sheet, T. M. Long yield stress and film properties while FIGS. 1 and 2 show the dependence of T. M. Long yield stress on the stretching temperature and the cast sheet density, respectively. In accordance with the overall crystallinity of the compound, the density of the cast sheet also decreases with increasing amounts of RCP. The T. M. Long yield stress decreases with increasing stretching temperature and/or with decreasing the density of the cast sheet as shown in FIGS. 1 and 2.

TABLE 4

Density of sheet stock and T. M. Long yield stress

|  | 667A | 667B | 667C | 667D | 667E | 884A |
|---|---|---|---|---|---|---|
| Resin Composition | D022 | 5% RCP | 10% RCP | 20% RCP | TR3020 | FF020D (30H036) |
| Density (cast sheet) | 0.9028 | 0.9025 | 0.9017 | 0.9017 | 0.8957 | 0.8988 |
| TML yield stress (psi) | | | | | | |
| @ 138° C. | 505 | 494 | 486 | 458 | 125 | 404 |
| @ 143° C. | 377 | 390 | 378 | 319 | 38 | 294 |
| @ 149° C. | 258 | 251 | 234 | 199 | — | 174 |

It is noted that FF020D that has 4.9% xylene solubles exhibits about 100 psi lower T. M. Long yield stress than D022 that has 2.9% xylene solubles irrespective of the stretching temperature. TR3020 that has 2.5% ethylene and 5.5% xylene solubles has significantly lower T. M. Long yield stress than FF020D. It can be attributed to the lower melting temperature and overall crystallinity of the random copolymer along with larger amounts of xylene solubles than the homopolymer. These results indicate that the crystalline state at the stretching temperature dictates the T. M. Long yield stress. It should be noted that the crystalline state of a polypropylene at a stretching temperature predominantly affects the viscosity of the "pseudo-melt" (because the polymer is partially melted) along with molecular weight. Table 5 gives the properties of film produced with T. M. Long stretcher. These results indicate that the tensile properties and haze of the compounds are comparable to those of homopolymer, i.e., FF020D, even at 20% addition of random copolymer. These results indicate that the homo-random polypropylene can be employed as an alternative BOPP material replacing high solubles homopolymer.

TABLE 5

Properties of film produced at 138° C. by stretching at 6.2 × 6.2 ratio

|  | 667A | 667B | 667C | 667D | 667E | 884A |
|---|---|---|---|---|---|---|
| Resin Composition | D022 | 5% RCP | 10% RCP | 20% RCP | TR3020 | FF020D (30H036) |
| Tensile Stress (kpsi) | 27.1 | 31.4 | 31.1 | 30.3 | 21.9 | 27.1 |
| Tensile Strain (%) | 63.2 | 70.2 | 72.4 | 74 | 59.9 | 69 |
| Modulus (kpsi) | 367 | 370 | 370 | 254 | 363 | 332 |
| Haze | 0.63 | 0.63 | 0.68 | 0.63 | 0.67 | 0.65 |

EXAMPLE 2

High Crystalline Polypropylene

A second set of compositions was prepared using a high crystallinity polypropylene homopolymer, F050HC, available from Sunoco. The random copolymer, TR3005, available from Sunoco, having 2.5% ethylene, was melt blended with the HC homopolymer via compounding as given in Table 6. A conventional BOPP material, FF029A, available from Sunoco, designed for the core material of clear film, was used as a control.

TABLE 6

Compounds prepared in this study

|  | 2100944 | | | |
|---|---|---|---|---|
|  | A | B | C | D |
| F050HC % | 100 | 85 | 70 | |
| TR3005 % | | 15 | 30 | |
| FF029A (31J026) | | | | 100 |

The melt flow rate (MFR) and The contents of xylene soluble were determined by the method prescribed in ASTM 1238 and 5492, respectively. The molecular weights were determined by high temperature size exclusion chromatography (HSEC) at 140° C. The melting temperature and recrystallization temperature for each composition was determined using annealed differential scanning calorimetry (ADSC). The polymers were melted at 230° C. for 5 minutes and cooled to 0° C. at a rate of 10° C./min while recording recrystallization exotherm. Then, the sample was heated to 190° C. at a rate of 10° C./min to record the melting endotherms. The heat of recrystallization was used to estimate the overall crystallinity (% Xc) of ICP.

Figure 3:
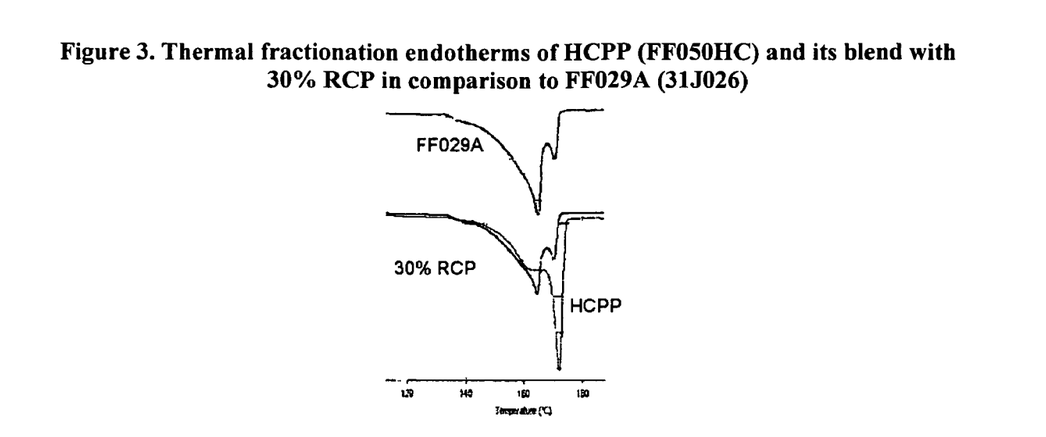
FIG. 3 shows the thermal fractionation endotherms of HCPP (FF050HC) and its blend with 30% RCP in comparison to FF029A (31J026).

The materials were also evaluated by thermal fractionation. The polymer melt was cooled to 170° C. at a rate of 20° C./min, followed by isothermal crystallization process during which the sample was held for 4 hrs. The isothermal crystallization process continued to decrease to 130° C. at 10° C. decrement. The temperature of the sample was then decreased to 0° C., and the sample was analyzed as it was heated to 200° C. at a rate of 10° C./min. to record the melting endotherm. It has been discovered that how well a material stretches on a tenter frame depends on the shape of endotherm recorded from the thermal fractionation. Thus, the thermal behavior of the compositions produced were evaluated via the thermal fractionation method as shown in FIG. 3. As can be seen, the blend with 30% of RCP has a trace similar to that of the standard BOPP grade material.

The characteristics of materials produced are given in Table 7. The commercial BOPP grade, FF029A that contains relatively large amounts of xylene solubles, e.g., 5.8%, was included for comparison. As noted in the previous Example (1), a RCP that has 2.5% ethylene has relatively lower crystallinity and larger amounts of xylene solubles than a homopolymer. Therefore, when added to homopolymer, a RCP should modify, i.e., decrease, the overall crystallinity. Table 7 confirms that the addition of RCP to a homopolymer slightly increases the amounts of xylene solubles, decreases the overall crystallinity and the recrystallization temperature. It is noted that the blend of F050HC with 30% TR3005 has a slightly higher crystallinity than FF029A. The molecular weight and distributions of all the polymers are comparable within the limit of experimental error.

TABLE 7

Characteristics of compounds containing RCP in comparison to FF029A

|  | 2100944 | | |
| --- | --- | --- | --- |
| | A<br>F050HC | B<br>15% TR3005 | C<br>30% TR3005 | D<br>FF029A<br>(31J026) |
| MFR | 6.2 | 4.6 | 3.7 | 3.0 |
| % XS | 1.73 | 2.28 | 3.12 | 5.82 |
| $T_m$ (° C.) | 163.7 | 162.2 | 159.3 | 159.1 |
| $T_c$ (° C.) | 118.1 | 115.1 | 112.9 | 112.6 |
| % $X_c$ | 61.9 | 58.6 | 55.2 | 53.3 |
| Mn/1000 | 53.5 | 63.2 | 65.8 | 50.4 |
| Mw/1000 | 252 | 278 | 283 | 257 |
| Mz/1000 | 779 | 819 | 838 | 988 |
| D | 4.7 | 4.4 | 4.3 | 5.1 |

Samples contain 0.15% Irgafos 168, 0.1% Irganox 1076, 0.1% Iranox 1010 and 0.025% DHT Cast Sheets and T. M. Long Films As in Example 1, cast sheets 22-23 mil thick sheet were produced using HPM sheet line (L/D=30) under the conditions in Table 8.

TABLE 8

| Zone | 1 | 2 | 3 | 4 | Die 1 | Die 2 | Melt Temp. |
| --- | --- | --- | --- | --- | --- | --- | --- |
| Temp. (° C.) | 204 | 246 | 260 | 260 | 260 | 260 | 263 |

The temperature of the chill roll was kept at 110° F. (43.3° C.). The density of the extruded sheets was measured in a Techne Density column containing 558 ml H₂O and 322 ml isopropanol mixture in a heavy flask and 327 ml H₂O an 553 ml isopropanol in a light flask.

The 22-23 mil sheets were stretched to 0.6-0.7 mil film by simultaneous stretching at 6.2×6.2 draw ratio with T. M. Long after 25 sec. pre-heating at a given stretching temperature. The yield stress was measured while stretching the cast sheet.

The film tensile properties were determined by the method prescribed in ASTM 882.

Strips (1"×8") from T. M. Long film were used to determine the tensile properties. Although ASTM recommends 10" grip separation and 1 in/min crosshead speed for the measurement of tensile modulus, 4" grip separation was employed due to the size of the T. M. Long film. Accordingly, the crosshead speed was adjusted to 0.4 in/min. For all other tensile properties, the crosshead speed was 2 in/min. At least 5 specimens were tested.

Optical properties such as transparency, haze and clarity of the film were evaluated by the method prescribed in ASTM 1003 (Haze and % transmittance) and ASTM 1746 (clarity).

Gloss was measured at the 3 different angles, 20, 45 and 60 degree by using the method described in ASTM 2457, where 60-deg. is recommended for intermediate gloss films, 20-deg. for high gloss films and 45-deg. for intermediate and low gloss films.

Shrinkage was measured using ASTM D2732. A rectangular cutout (3.9"×3.9") from the T. M. Long film was placed in a "Free Shrink" holder such that the cutout is free from contact with the edge of the holder. Then, the holder was immersed in an oil bath for at least 10 seconds at a given temperature in order for the material to come to thermal equilibrium and undergo maximum shrinkage. The holder was removed from the oil bath and quickly immersed in oil at room temperature. After at least 5 seconds, the sample was removed from the oil. After removing the remaining oil from the specimen, the dimension of the specimen was measured and the shrinkage was calculated using the equation:

% shrinkage=$(L_o-L_f)/L_o \times 100$ where $L_o$ is the initial length and $L_f$ length after shrinking.

Figure 4:
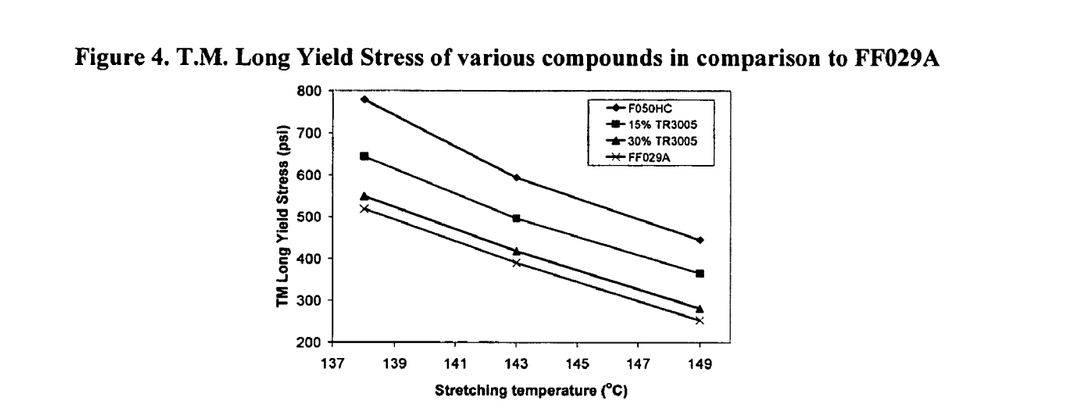
FIG. 4 shows the T. M. Long Yield Stress of various compounds as a function of temperature.
Figure 5:
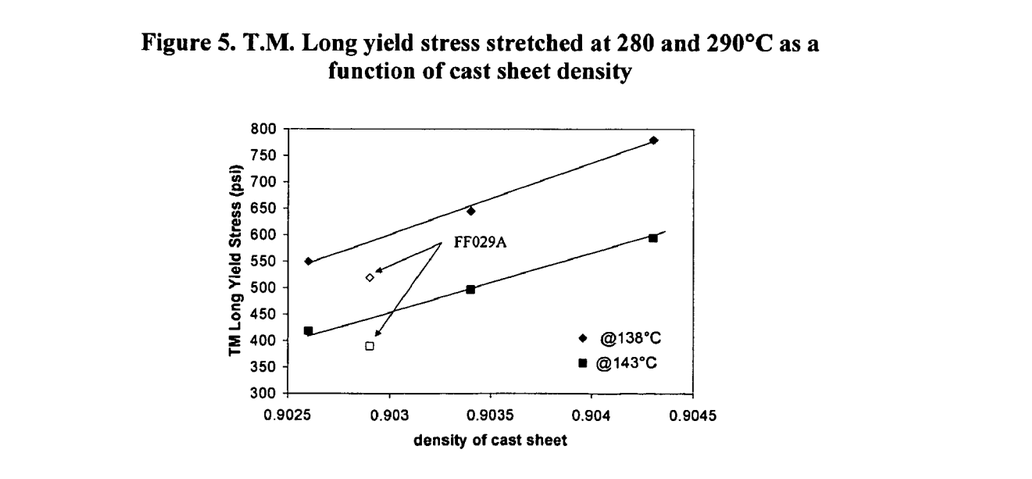
FIG. 5 shows the T. M. Long yield stress stretched at 280 and 290° F. as a function of cast sheet density.
Figure 6:
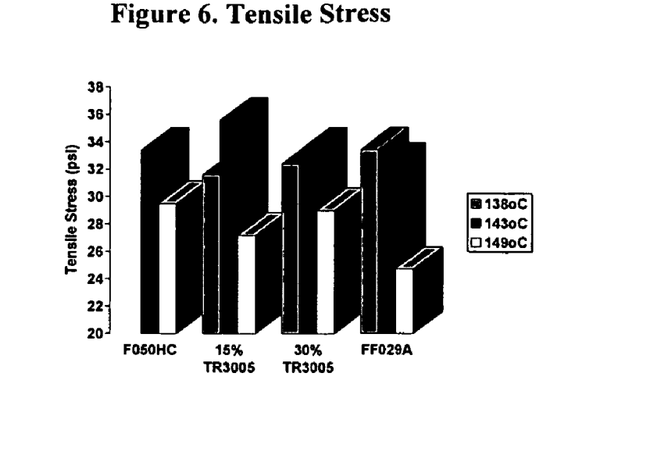
FIG. 6 shows the Tensile Stress of films made from various resins.
Figure 7:
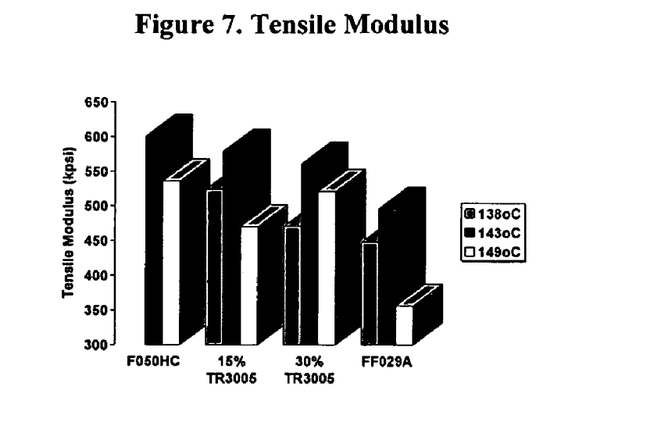
FIG. 7 shows the Tensile Modulus of films made from various resins.
Figure 8:
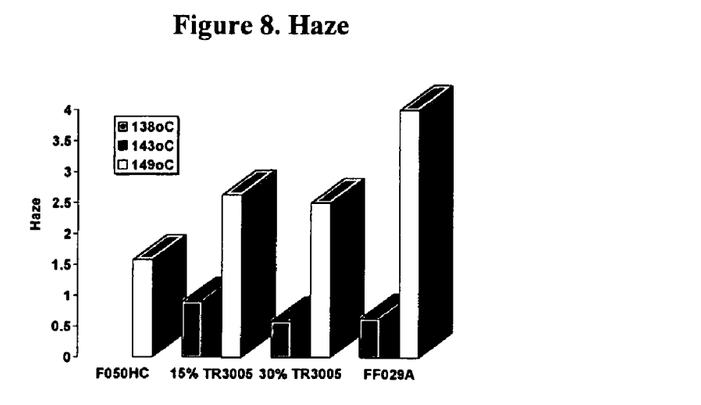
FIG. 8 shows the Haze of films made from various resins.
Figure 9:
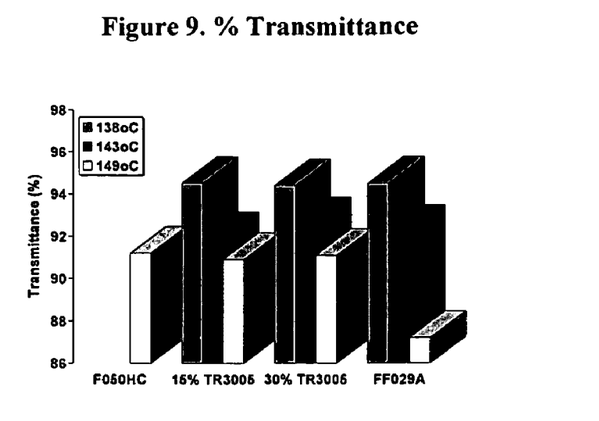
FIG. 9 shows the % Transmittance of films made from various resins.
Figure 10:
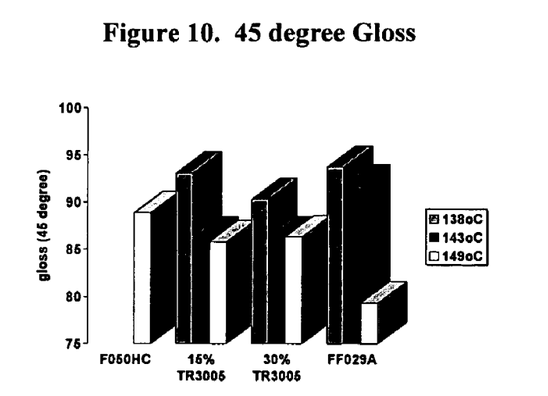
FIG. 10 shows the 45 degree gloss of films made from various resins.
Figure 11:
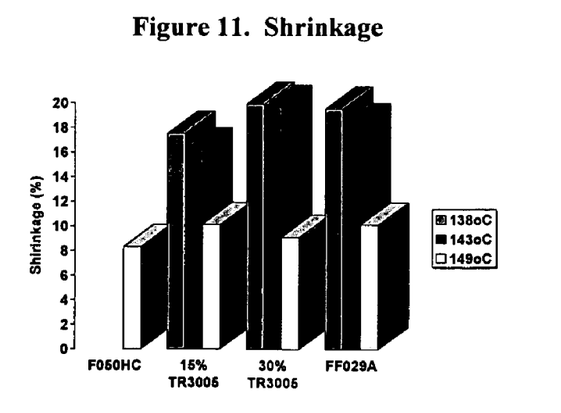
FIG. 11 shows the Shrinkage of films made from various resins.

Table 9 gives the density of the cast sheet, the T. M. Long yield stress and film properties while FIGS. 4 and 5 show the dependence of the T. M. Long yield stress on the stretching temperature and the cast sheet density, respectively.

TABLE 9

Density of sheet stock and T. M. Long yield stress

| | A | B | C | D |
| --- | --- | --- | --- | --- |
| Resin Composition | F050HC | 15%<br>TR3005 | 30%<br>TR3005 | FF029A |
| Density (Cast Sheet) | 0.9043 | 0.9034 | 0.9026 | 0.9029 |
| T. M. Long yield stress | | | | |
| @ 138° C. | 779[a] | 644 | 549 | 519 |
| @ 143° C. | 594 | 496 | 418 | 390 |
| @ 149° C. | 445 | 365 | 281 | 253 |

[a]the film tore during stretching after yield.

In accordance with the overall crystallinity of the materials, the density of the cast sheet decreases with increasing amounts of RCP as does the T. M. Long yield stress as shown in FIGS. 4 and 5. While the T. M. Long film of FF050HC tore after yielding when stretched at 138° C., the blend containing 15% random copolymer did not tear when stretched. It is noted that although the blend that contains 30% random copolymer has a slightly lower density than FF029A, its T. M. Long yield stress is higher as shown in FIG. 5. Since the T. M. Long yield stress depends on the density, i.e., crystallinity, of the cast sheet at the stretching temperature, it appears that the blend containing 30% random copolymer should have a higher density at the stretching temperature than FF029A does.

The properties of film produced at 3 different temperatures with a T. M. Long stretcher are given in Table 10 and depicted in FIGS. 6-11. The results in Table 10 may be summarized as follows. The T. M. Long films produced from the blends exhibit higher tensile properties than those produced from FF029A. Haze and % transmittance of the film produced from the blends at 138° C. and/or 143° C. are comparable to those produced from FF029A. However, when stretched at 149° C., the film produced from FF029A is much hazier than those from the blends. The 45-degree gloss varies depending upon the stretching temperature. The shrinkage of the film from the blends is slightly lesser than that from FF029A.

TABLE 10

Properties of T. M. Long film produced at various temperatures

2100944

| | A<br>F050HC[a] | B<br>15% TR3005 | C<br>30% TR3005 | D<br>FF029A |
|---|---|---|---|---|
| 138° C. | | | | |
| Haze | — | 0.90 | 0.58 | 0.63 |
| Transmittance (%) | — | 94.5 | 94.4 | 94.5 |
| Clarity | — | 97.4 | 98.1 | 98.0 |
| Gloss 20 | — | 36.1 | 27.2 | 41.0 |
| 45 | — | 93.1 | 90.3 | 93.7 |
| 60 | — | 129.7 | 114.2 | 114.2 |
| Tensile stress (kpsi) | — | 31.6 | 32.4 | 33.4 |
| Tensile strain (%) | — | 68.6 | 70.0 | 72.0 |
| Modulus (kpsi) | — | 524 | 471 | 448 |
| Shrinkage (%) | — | 17.5 | 19.9 | 19.5 |
| 143° C. | | | | |
| Haze | — | 0.72 | 0.77 | 0.61 |
| Transmittance (%) | — | 91.9 | 92.6 | 92.2 |
| Clarity | — | 97.8 | 97.4 | 98.9 |
| Gloss 20 | — | 47.1 | 89.4 | 84.3 |
| 45 | — | 86.2 | 86.2 | 91.7 |
| 60 | — | 127.2 | 126.3 | 126.4 |
| Tensile stress (kpsi) | 33.4 | 35.6 | 33.4 | 32.3 |
| Tensile strain (%) | 75.0 | 77.3 | 80.0 | 72.1 |
| Modulus (kpsi) | 601 | 579 | 561 | 496 |
| Shrinkage (%) | — | 16.16 | 19.65 | 18.17 |
| 149° C. | | | | |
| Haze | 1.58 | 2.63 | 2.5 | 6.08 |
| Transmittance (%) | 91.2 | 90.9 | 91.1 | 87.2 |
| Clarity | 95.3 | 90.5 | 91.3 | 87.1 |
| Gloss 20 | 44.5 | 67.1 | 47.3 | 46.7 |
| 45 | 88.9 | 85.8 | 86.3 | 79.3 |
| 60 | 113.9 | 114.4 | 109.1 | 103.8 |
| Tensile stress (kpsi) | 29.5 | 27.2 | 29 | 24.7 |
| Tensile strain (%) | 83.6 | 65 | 81.5 | 66 |
| Modulus (kpsi) | 536 | 470 | 521 | 356 |
| Shrinkage (%) | 8.3 | 10.1 | 9.1 | 10.1 |

[a]film broke after yield when stretched at 138° C.

EXAMPLE 3

In-Reactor Blending

Polypropylene homopolymer was continuously produced at 70° C. in a first stage polymerization using two loop reactors by using a catalyst system (catalyst, co-catalyst and external donor) that provides relatively high isotacticity, followed by production of 10-20 wt % random copolymer containing 2.5 wt ethylene in a second stage gas phase reactor. The propylene monomer was fed the loop reactors at a rate of 80 kg/h while maintaining 700 ppm $H_2$ and the density of 560 g/l. The homopolymer was continuously transferred to the second stage gas phase reactor where the random copolymer was produced. To produce the random copolymer, both ethylene and propylene at 0.03 mol % gas phase ratio (C2/C2+C3) and 0.015 mole % $H_2$ were fed to the gas phase reactor. The characteristics of the in situ polymer blend produced in the continuous reactor are given in Table in comparison to a HCPP. Table 11 indicates that the HCPP/RCP blend produced in-situ contains 12 wt % random copolymer and less than 2 wt % XS.

TABLE 11

Characteristics and Properties of in situ blend and HCPP homopolymer

| LIMS # | HCPP | Blend | |
|---|---|---|---|
| % RCP | 0 | 12* | |
| MFR | 1.2 | 2.8 | |
| % XS | 1.68 | 1.87 | |
| C2 - total | 0 | 0.3 | |
| | | XIS | XS |
| C2 | — | 0.17 | 9.31 |
| Mn/1000 | — | 63.5 | 51.8 |
| Mw/1000 | — | 311 | 124 |
| Mz/1000 | — | 1097 | 437 |
| D | — | 4.9 | 2.4 |
| $T_m$ (° C.) | 167 | 166.6 | |
| $T_c$ (° C.) | 119.6 | 117.3 | |
| % $X_c$ | 59.8 | 57.2 | |
| Flex modulus (kpsi) | 272 | 249 | |
| TS @Y (psi) | 5519 | 5364 | |

*estimated based on ethylene content.

The examples provided demonstrate that the addition of RCP to a homopolymer, which has relatively small amounts of xylene solubles and is not easily stretchable, facilitates the stretchability of the homopolymer. Thus it is possible to replace standard high solubles BOPP grade polypropylene homopolymers with lower solubles content materials. This is especially advantageous to produce a stiffer film since a high crystalline PP can be modified to be stretchable under the conventional processing conditions. Further, the films produced from the blend containing RCP exhibit improved properties over films produced with standard BOPP grade polypropylene.

The present invention has thus been described in general terms with reference to specific examples. Those skilled in the art will recognize that the invention is not limited to the specific embodiments disclosed in the examples. Those skilled in the art will understand the full scope of the invention from the appended claims.

What is claimed is:

1. A process for producing a polymer blend, said process comprising:
    polymerizing propylene in the presence of a Ziegler Natta catalyst in a first stage of a two stage reactor train to produce a homopolymer having a xylene solubles content of less than 3%;
    transferring the homopolymer to a second stage of the two stage reactor train; and
    polymerizing propylene and ethylene in said second stage in the presence of the homopolymer to produce a propylene/ethylene random copolymer having an ethylene content of from about 0.5% to about 7%, to produce a blend of the homopolymer and random copolymer;
    wherein the blend comprises from about 70 to about 95% by weight of the homopolymer and from about 5 to about 30% by weight of the random copolymer.

2. The process according to claim 1, wherein:
    the homopolymer has a crystalline content of at least 55%.

3. The process according to claim 1, wherein:
    the blend comprises from about 70 to about 90% of the homopolymer and from about 10 to about 30% of the random copolymer.

4. The process according to claim 1, wherein:
    the first stage reactor is a liquid phase reactor, and the second stage reactor is a gas phase reactor.

5. The process according to claim 1, wherein:
the first stage reactor and the second stage reactor are both gas phase reactors.

6. A process for producing a polymer blend, said process comprising:
polymerizing propylene in the presence of a Ziegler-Natta catalyst and hydrogen in a first stage including at least one liquid phase polymerization reactor to produce a homopolymer having a crystalline content of at least 55% and a xylene solubles content of less than 3%;
transferring the homopolymer to a second stage including at least one gas phase reactor, wherein the homopolymer still contains active sites; and
polymerizing propylene and ethylene in said second stage in the presence of hydrogen and said homopolymer, to produce a propylene/ethylene random copolymer having an ethylene content of from about 0.5 to about 7%, to produce a blend of the homopolymer and random copolymer;
wherein the blend comprises from about 70 to about 95% by weight of the homopolymer and from about 5 to about 30% by weight of the random copolymer.

7. The process according to claim 6, wherein:
the blend comprises from about 70 to about 90% of the homopolymer and from about 10 to about 30% of the random copolymer.

8. The process of claim 1, wherein said polymerizing propylene in the presence of a Ziegler Natta catalyst in a first stage of a two stage reactor train takes place while maintaining 700 ppm hydrogen in said first stage.

9. The process of claim 6, wherein said hydrogen is maintained at 700 ppm.

10. The process of claim 8, wherein said propylene is fed into said first stage at 80 kg/h.

11. The process of claim 9, wherein said propylene is fed into said first stage at 80 kg/h.

* * * * *